United States Patent [19]

Srail et al.

[11] Patent Number: 5,002,677
[45] Date of Patent: Mar. 26, 1991

[54] FLEXIBLE HIGH ENERGY MAGNETIC BLEND COMPOSITIONS BASED ON FERRITE PARTICLES IN HIGHLY SATURATED NITRILE RUBBER AND METHODS OF PROCESSING THE SAME

[75] Inventors: Raymond C. Srail, Parma; Richard A. Glover, Brookpark; Tiong H. Kuan, Hudson; Thomas R. Szczepanski, North Royalton, all of Ohio

[73] Assignee: The B. F. Goodrich Company, Akron, Ohio

[21] Appl. No.: 409,491

[22] Filed: Sep. 19, 1989

[51] Int. Cl.$^5$ .............................................. C04B 35/04
[52] U.S. Cl. ................................... 252/62.54; 428/900
[58] Field of Search ...................... 252/62.54; 428/900

[56] References Cited

U.S. PATENT DOCUMENTS 4,308,155 12/1981 Tada et al. ........................ 252/62.54
4,555,449 11/1985 Koleske et al. ................... 252/62.54

Primary Examiner—Mark L. Bell
Assistant Examiner—Alan Wright
Attorney, Agent, or Firm—James R. Lindsay; Daniel J. Hudak

[57] ABSTRACT

A flexible magnetic blend composition is provided which is comprised of high energy ferrite magnetic particles in a flexible high temperature resistant and oil resistant polymer binder. The binder system is preferably a highly saturated nitrile rubber (HSN) or a polymer alloy of the same in which a HSN is the major polymer containing alloying polymers and/or additives which are compatible with processing, subsequent electron beam curing, and final product performance. The binder system is highly loaded usually from 55 to 65 volume percent with the high energy ferrite particles, i.e., barium and/or strontium ferrite particles, which can produce bonded magnets with a maximum energy product of at least 1.0 megagauss-oersteds, a remenance, Br, of at least 2000 gauss, a coercive force, $H_c$, of at least 1800 oersteds, and an intrinsic coercivity, $H_{ci}$, of at least 2000 oersteds. The process for production of this system involves the binder system and ferrite particles being mixed, the ferrite particles oriented in a preferred direction during processing, then formed into a final geometry before being cured by high voltage electron beam radiation, preferably in excess of 3,000,000 electron volts. The electron beam curing in the solid state fixes dimensional stability, magnetic properties, oil, solvent, and chemical resistance of the part even when exposed to subsequent hostile temperature environments of 125° C. or higher. Any off geometry parts or trim produced in the process prior to radiation curing can be recycled through processing several times without fear of premature cure.

23 Claims, 3 Drawing Sheets

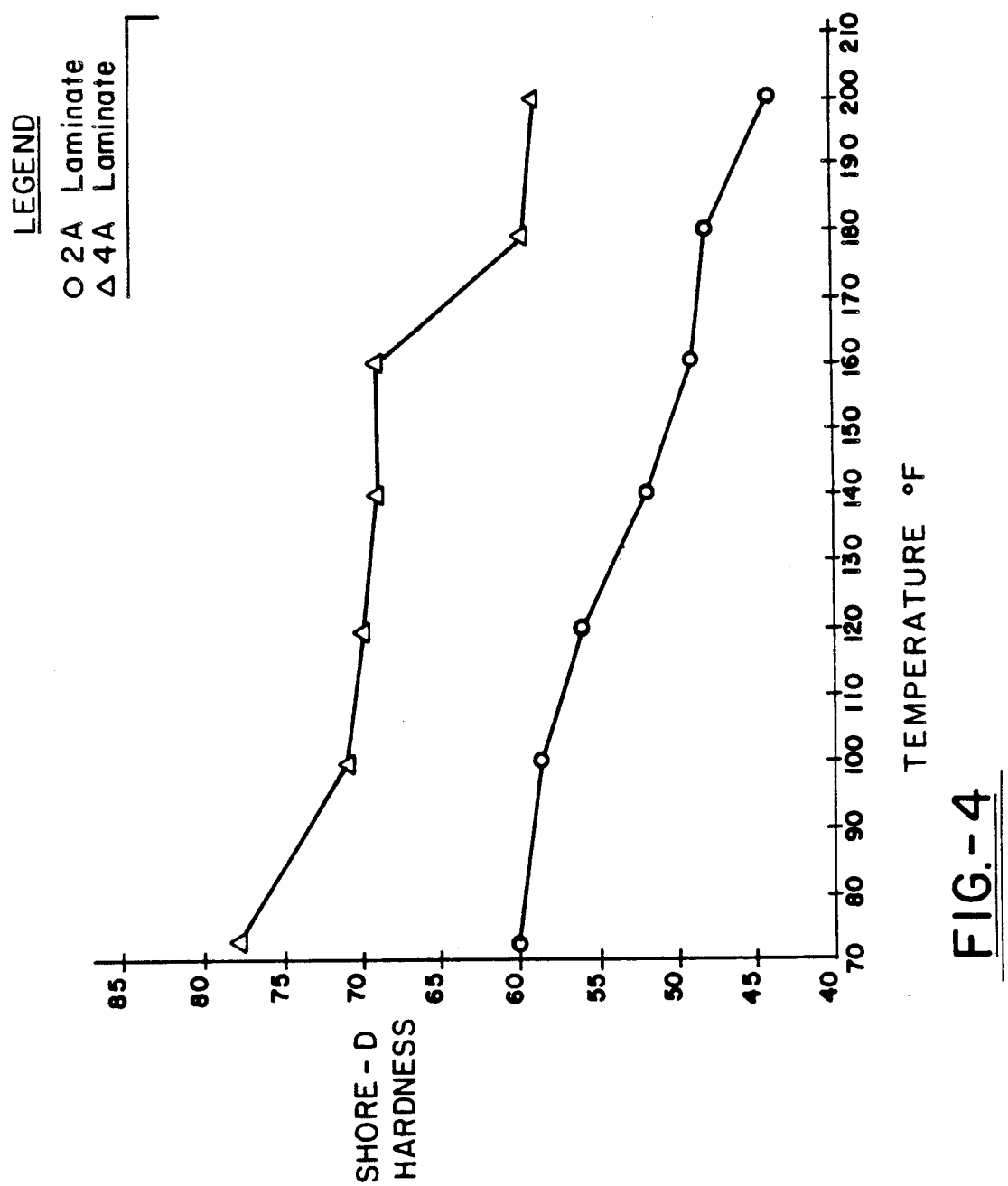

FLEXIBLE HIGH ENERGY MAGNETIC BLEND COMPOSITIONS BASED ON FERRITE PARTICLES IN HIGHLY SATURATED NITRILE RUBBER AND METHODS OF PROCESSING THE SAME

FIELD OF THE INVENTION

This invention relates to flexible high energy ferrite magnetic blend compositions comprised of a high temperature resistant, oil, solvent and chemical resistant polymer binder system which is highly loaded with ferrite particles. The binder system and particles are mixed and then shaped before curing which is effected by exposure to high voltage election beam radiation.

BACKGROUND

While flexible magnetic blend compositions have been known for some time, a high temperature, oil resistant, flexible high energy ferrite magnetic material in strip form has continued to be a target for research and development. In particular, there has been interest in finding such a material for automotive applications, including, for example, electromechanical applications in this area. Such a material would be of great interest for use in making permanent magnet motor stators and rotors.

In particular, it has been known to use a conventional nitrile rubber system containing chemical curing agents, such as sulfur. An example of such a product is sold by Minnesota Mining and Manufacturing Corp., (3M), St. Paul, Minn., under the designation B1030. It is believed that this product is made by laminating shear oriented calendered sheets under heat and pressure to build-up the final thickness. If the thickness of the laminated sheet as molded is not precise, it is ground to size, leaving a relatively dirty surface (i.e., the ferrite particles at the surface are loose). The final cured sheet cannot be reprocessed or recycled. Aging of the laminated sheet or strips cut from it at temperatures above 100° C. is rapid and results in severe embrittlement. This is due in part to the chemical unsaturation of the backbone of the binder system, and in part to the residual curing agents which remain after the initial cure.

SUMMARY OF THE INVENTION

The invention relates to a flexible high energy ferrite magnetic blend composition comprising a high temperature oil resistant, electron beam curable binder system which will accept a high loading of a high energy ferrite. The binder system must not only "wet out" the ferrite particles at the desired concentration, but must give proper characteristics to the mixture to allow it to be processed, oriented in a preferred magnetic direction, and shaped before curing. A preferred binder system is based on a highly saturated nitrile rubber having a bound acrylonitrile concentration of 36 to 45 percent by weight and a percent saturation of at least 85 percent by weight. The composition also comprises at least 55 percent by volume, and preferably at least 60 percent by volume of a high energy magnetic ferrite which is strontium and/or barium ferrite.

The invention further relates to a process for making a product from the blend composition, which comprises mixing the binder system and the ferrite magnetic particles to form a uniform mixture, orienting the magnetic particles, shaping a product from the mixture, and curing the mixture by exposing the mixture to an electron beam from an electron beam accelerator.

It is an advantage of the present invention to provide a flexible ferrite magnetic blend composition which has improved resistance to certain liquids; such as resistance to oil, to oxidized sour gasoline, to oil additives and to acid and base systems. Moreover, this improved resistance is maintained even at elevated temperatures.

It is a further improvement to provide a flexible ferrite magnetic blend composition having improved air-aging characteristics, ozone resistance, and high temperature resistance.

It is a further improvement to provide a flexible ferrite magnetic blend composition, as well as a method of manufacture, in which the product is cured at virtually room temperature, i.e., less than 50oC, and at atmospheric pressure. It is a further advantage that the geometric memory and dimensional structure are essentially locked in, even if the product is exposed to subsequent temperatures of more than 125° C. It is a further advantage that this can be accomplished in a relatively short period in continuous processing, i.e., in two passes at 2.5 megarads of electron beam radiation dosage per pass at 20 feet per minute. It is a further advantage that the magnetic properties memory is also set in this manner.

A further advantage of the present invention is that product which is off-dimension in geometry prior to cure can be recycled many times. This represents a large savings in product manufacturing cost.

BRIEF DESCRIPTION OF THE DRAWINGS

FIG. 4 is a plot of Shore D hardness versus temperature for Samples 2A and 4A of Example 4.

DETAILED DESCRIPTION OF THE INVENTION

Figure 1:
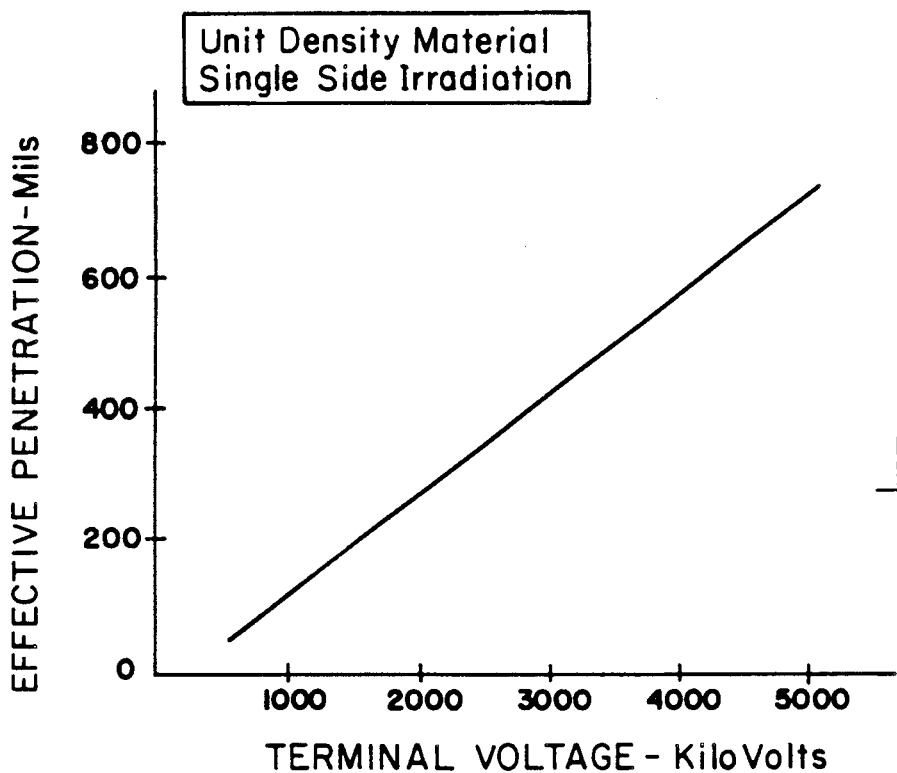
FIG. 1 is a plot of effective penetration of a unit density materal versus terminal voltage for single-side irradiation with an electron beam accelerator.

The invention relates to flexible ferrite magnetic blend compositions having a maximum energy product of from about 1.0 to about 2.0 MgOe. The blend compositions are comprised of a polymeric binder system, which is highly loaded with high energy magnetic particles.

In order to provide an acceptable binder system the following criteria must be met: The binder system needs to accept a high volume loading of high performance ferrite powder. The binder system needs to have a low viscosity at processing temperatures, generally less than $5\times10^5$ poise at 30 sec$^{-1}$ shear rate, and enough hot strength to allow a product, and particularly an extruded strip, to be made from a mixture of ferrite powder and the binder system. The binder system must provide a sufficiently high uncured "green strength" at room temperature so that the product can be formed and handled prior to curing. The compound should be curable by electron beam radiation. The cured magnet compound needs to have a long term high-temperature resistance of at least about 80° C., and an oil resistance where volume swell in ASTM #1 or ASTM #3 oils is less than 5 percent, and preferably less than 2 percent, after 46 hours at 23° C.

A preferred binder system which fits the above criteria is based on a highly saturated nitrile elastomer ("HSN"). The elastomer consists of the following chemical structures:

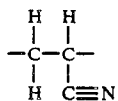

from the bound acrylonitrile,

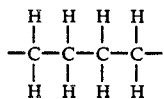

from the hydrogen saturated butadiene, and a small amount of

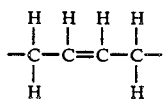

from the residual butadiene left unsaturated.

A suitable nitrile rubber is from 30 to 50 percent bound acrylonitrile, the remainder being butadiene in the elastomer (i.e. acrylonitrile butadiene rubber ("NBR") before saturation. Preferably, the elastomer is 34 to 48 percent bound acrylonitrile, and most preferably 36 to 45 percent bound acrylonitrile. The rubber is preferably at least 85 percent saturated, and more preferably at least 90 percent saturated.

Table I shows some of these preferred elastomers and their specifications—several are used in the examples.

though, the higher the degree of hydrogenation, the higher the Mooney viscosity. The glass transition temperature varies according to those of the raw materials, but ranges from minus 15° C. to minus 40° C.

During hydrogenation, it is important to achieve selective hydrogenation of the carbon-carbon double bonds without hydrogenation of the cyano groups. When using a palladium catalyst, the 1,2 segmers in the butadiene units are preferentially hydrogenated, and the polymer properties are decided according to the amount of remaining 1,4 segmers. Of course, other catalyst systems are also known. Patents which relate to the hydrogenation of nitrile butadiene elastomers include U.S. Pat. No. 3,700,637 to the Shell Oil Company; Great Britain Patent 1,558,491 to Bayer A.G.; German Patent 3,329,974-A to Weinstein (Goodyear); U.S. Pat. No. 4,464,515 to Polysar; Japanese Kokai Patent 59-117501 to Nippon Zeon; Great Britain Patent 2,011,911A to Johnson, Matthey; U.S. Pat. No. 4,384,081 and Japan Kokai Patent 57-202305 to Nippon Zeon; U.S. Pat. No. 4,452,951 and Japan Kokai Patent 57-295404 to Nippon Zeon; U.S. Pat. No. 4,337,329 to Nippon Zeon; U.S. Pat. No. 2,585,583 to Du Pont; U.S. Pat. No. 4,469,849 to Johnson, Matthey; and U.S. Pat. No. 4,452,950; all of which are incorporated herein by reference as if fully set forth herein.

The polymer system which is suitable for the present invention may include appropriate alloys or blending agents so long as the specified criteria are maintained. The polymer system is preferably at least 70 percent HSN (highly saturated nitrile rubber) and can be up to 30 percent by weight of alloying polymers. One such alloying thermoplastic polymer is an impact modified acrylonitrile-methylacrylate copolymer, specific gravity = 1.15, known as "Barex" 210 produced and sold by B.P. Chemicals International, Cleveland, Ohio. "Barex" 210 can be blended up to 30 weight percent of the total polymer system (HSN being the remaining 70 percent)

TABLE I

| Elastomer Designation | Manufacturer | Specific Gravity | Bound ACN Weight % | Saturation % | Mooney Viscosity ML1 + 4 @ 100° C. |
|---|---|---|---|---|---|
| Zetpol 1010 | Zeon Chemicals Inc. Bayport, Texas | 1.00 | 44 | 96 | 80 |
| Zetpol 1020 | Zeon Chemicals Inc. Bayport, Texas | 1.00 | 44 | 90 | 75 |
| Zetpol 2000L | Zeon Chemicals Inc. Bayport, Texas | 0.98 | 36 | 99 | 65 |
| Therban 2207 | Mobay Corporation Pittsburgh, PA. | 0.98 | 43 | 99 | 75 |
| Tornaq C4545 | Polysar LTD. Sarnia, Ontario | 1.00 | 45 | 95 | 45[1] |
| Tornaq A4555 | Polysar LTD. Sarnia, Ontario | 1.00 | 45 | 99.5 | 55[1] |

[1]Reported as Mooney Viscosity ML1 + 4 @ 125° C.

It is believed to be preferable in the present instance to utilize a highly saturated nitrile elastomer such as those described above. Although a similar structure could be obtained by copolymerization of ethylene with acrylonitrile, the preferred binder polymer is usually obtained by hydrogenation of olefin segmers of NBR. The hydrogenation method can be carried out after preparing the NBR so that polymers having differing concentrations of acrylonitrile can be prepared. Further, the amount of saturation can be controlled. The molecular weight of such elastomers before and after hydrogenation has shown little change. The temperature dependence of Mooney viscosity of the saturated nitrile polymer is the same as conventional NBR, alto produce a less flexible magnet. with improved chemical/solvent resistance (see Example 4).

Other electron beam cure and blend compatible elastomers such as "Hydrin" 400, a peroxide curable epichlorohydrin-ethylene oxide elastomer, specific gravity = 1.27, Mooney Viscosity ML1+4@100° C.=80 produced by the BFGoodrich Company, Cleveland, Ohio, can be used up to 30 weight percent of the total polymer system (HSN being the remaining 70 percent) to produce flexible magnets with a high level of oil resistance, slightly better cold temperature properties (lower freeze point), and reduced material cost while still retaining good high temperature properties. There are several other blend and electron beam cure compatible polymers, both elastomeric and thermoplastic, that can be blended up to 30 weight percent of the total polymer system, the polymer system masterbatched with additives to produce a binder system, the binder system blended with a high quality ferrite to form a magnetic compound, the magnetic compound then processed into a final geometrical shape and electron beam cured to produce the final magnetic part. The selection of the alloying polymers depends not only on the desired processibility of the compound but also the desired properties of the final magnetic part.

good agreement to practice) to volume loadings used in commercially bonded ferrite products (as Br and Hc vary in direct proportion to volume loading and BHmax varies in proportion to the square of the volume loading). In Table II below, some of the preferred commercial ferrite powders are listed with predicted maximum potential properties at expected maximum volume loading. It should be noted that the plate-like ferrites can realize most of their potential by shear (mechanical) orientation in thin sheets while the ferrites with some blocky morphology require the presence of a magnetic field to reach their maximum potential.

TABLE II

| Ferrite Powder Designation | Manufacturer | Ferrite Type | Specific Gravity | ASTM B330 Avg. Particle Size, microns | Estimated Max. Vol. Loading, % |
|---|---|---|---|---|---|
| BG10 or Stabon E-120 | Stackpole Corp. Kane, PA. | Barium | 5.35–5.40 | 1.2–1.5 | 62 |
| BG12 or Stabon E-140 | Stackpole Corp. Kane, PA. | Barium | 5.35–5.40 | 1.2–1.5 | 62 |
| HM 170 | Hoosier Corp. Toledo, Ohio | Strontium, Minor Barium | 5.19–5.26 | 1.4–1.7 | 62–64 |
| UHE-6 | Basic Pigment Edison, NJ | Strontium, Minor Barium and Lead | 5.34 | 0.8–1.0 | 56 |

| Estimated Maximum Potential Magnetic Properties at Max. Volume Loading[1] | | | | | |
|---|---|---|---|---|---|
| Oriented - "Z" Direction | | | | Unoriented Isotropic | |
| Br, Gauss | Hc Oersteds | $BH_{max}$ Megagauss-oersteds | Hci Oersteds | $BH_{max}$ Megagauss-Oersteds | Morphology of Particles |
| 2510 | 2150 | 1.52 | 3200 | 0.48 | Plate-like |
| 2650 | 2250 | 1.68 | 4000 | 0.49 | Plate-like |
| 2770 | 2400 | 1.82 | 3000 | 0.50 | Plate-like and Blocky Particles |
| 2280 | 2240 | 1.26 | 3800 | 0.35 | Plate-like |

[1]Predictions extrapolated from oriented cube data at lower volume loadings

The magnetic particles of the present invention are a ferrite composition comprising barium ferrite and/or strontium ferrite.

In some cases a small amount of lead ferrite is included in the composition of the high energy ferrite powders used in bonded magnets. The average particle size as determined by the Fisher Sub-Sieve Sizer Method (ASTM B330) is from 0.8 to 2.5 microns, preferably from 1.0 to 1.9 microns and most preferably from 1.0 to 1.6 microns. High enerqy ferrite powders used are distinguished from low energy ferrites, such as those used in refrigerator gaskets, by their ability to orient nearly all their important magnetic properties (i.e., remenance-$B_r$, coercivity-Hc, maximum energy product-$BH_{max}$) in a desired direction. This phenomena is known as anisotropy. In a three dimensional model composed of X, Y, and Z dimensions, the preferred direction, Z, may correspond to the thickness direction of an extruded strip, while the X and Y directions may correspond to the length and width directions of that strip.

One way to determine the maximum potential magnetic properties in the preferred "Z" direction is to prepare a cube with a relatively low volume loading (i.e., 20 to 30 percent) of ferrite powder blended with a low viscosity thermoset binder, apply a m;agnetic field of 8000 oersteds or higher to this mixture in the "Z" direction of the mold and maintain this field until the mixture "sets" or "cures." This will allow hysteresis magnetic properties to be measured in X, Y and Z directions of the cube. Comparisons can then be made to determine the anisotropy of the powder. Also the Z direction properties can be extrapolated (with fairly The intrinsic coercivity, $H_{ci}$, is important some applications, such as in permanent magnet motors, where demagnetizing fields are present during use. This property appears to be dependent upon several factors, such as particle size, ferrite type, acid treatment, processing severity, etc., and is generally much higher than the lower energy ferrites, i.e., at least about 2000 oersteds and preferably at least about 2500 oersteds.

Other additives which can be added to the polymer to form the binder system include processing aids and antidegradants as are known in the art. Particularly suitable are additives which are compatible with electron beam curing, that is, they will not seriously interfere with the binder crosslinking reaction or become embrittled or be depolymerized themselves from the radiation dosage. In general, additives used in chemical peroxide cures of elastomers are very often suitable for electron beam curing. One of these additives is the processing aid "STRUKTOL" TR016, a mixture of selected and specially treated fatty acid derivatives, specific gravity=1.00, melting point =99° C., sold by Struktol Corporation, Stow, Ohio. Some preferred antidegradants are "Vanox" ZMTI, zinc 2-mercaptotoluimidazole antioxidant powder, specific gravity =1.69, melting point 300° C., sold by RT Vanderbilt Company, Inc., Norwalk Conn., and "Naugard" 445, a 4,4'-di(alpha,alphadiphenyl amine antioxidant, specific gravity =1.14, melting point 96°–98° C., sold by Uniroyal Chemical Co., Middlebury, Conn. These additives are usually masterbatched with the highly saturated acrylonitrile-butadiene elastomer or polymer alloys containing highly saturated acrylo-nitrile-butadiene elastomer to become the "binder system" prior to blending with the ferrite powders, and can be present individually up to 10 parts by weight per hundred of "polymer" and preferably at about 1 to 5 parts per hundred of "polymer." Other processing aids and antidegradants of the types mentioned above or as known in the art may be incorporated in the binder masterbatch, with the combined total level of all additives preferably up to 10 parts by weight per hundred of polymer.

The process of the present invention comprises mixing a binder system and ferrite magnetic particles to form a uniform mixture, orienting the magnet particles such as by high shear and/or by an induced magnetic field and shaping a product from said mixture, and curing said mixture by exposing said mixture to an electron beam from an electron beam accelerator.

Preferably the binder system containing the additives is masterbatched in an internal mixer such as a Banbury mixer at 320° F. maximum temperature followed by sheeting out on a two-roll mill (1.3 friction ratio) with the fast roll maintained at 250° F. and the slow roll under 200° F. The ferrite/binder system mixing step can take place on any conventional compounding equipment, such as a mill, a Banbury, or a Buss kneader. An example of the ferrite/binder system compounding step would be to add the masterbatched binder system to a mill, to subsequently add the particulate ferrite in steps to achieve a loading of at least 55 percent volume loading, and more preferably 60 to 62 percent volume loading. This loading is usually dependent upon the maximum packing achievable by the ferrite due to its morphology. The ferrite/binder system mixing, blending and banding is accomplished as one example, on a two-roll mill, of friction ratio (speed differential) of 1.3 to 1.5. Small batches can be mixed and banded by keeping both rolls at temperatures below 130° F. Since it is more practical to process larger production batches at higher temperatures, the fast roll of the mill is kept in the 250° to 280° F. temperature range while the slow roll is cooled to at least 50° F. below the fast roll temperature to provide optimum mixing and banding of the ferrite/binder system mixture. When the blend is uniform, the compounded banded sheet is removed from the mill and allowed to cool prior to being granulated on conventional granulating equipment to provide feed for extrusion or other conversion processes such as calendaring. A suitable example of an extruding machine is a single screw extruder with a L/D ratio of less than 20 to 1 and a straight taper screw with a compression ratio less than 1.5 to 1. Extrusion takes place at temperatures in the range between about 140° C. and 180° C., depending on the compound being extruded.

Assuming that the preferred ferrite particles are anisotropic, i.e., that they have a preferred direction of magnetization, the mixture is subjected to means to effect a substantially uniform orientation of the "poles" of the magnetic particles (i.e., the "thin" dimension of the hexagonal crystal ferrite platelets). This orientation means may include, for example, high shear orientation, such as passing the mixture through a high shear die, and/or induction such as subjecting the mixture to a strong magnetic field of at least about 8000 oersteds to produce oriented magnetic properties in the product.

The formed oriented mixture is subjected to a curing step, by passing the formed product through electron beam radiation. The major advantage of electron beam processing of polymer compositions over competitive chemical processes is that irradiation can be carried out on previously shaped products such as film, tubing, wire, strip, and other profiles, moldings, etc., in the solid state at ambient temperatures. Electron beam processing can offer significant cost savings through the elimination of catalyst accelerators and other components of conventional chemical crosslinking or other polymer modification systems. It also eliminates or reduces costs associated with the mixing of these ingredients in such polymer compositions and avoids expenses incurred in connection with severe limitations on processing speeds to prevent excessive exotherm and probable scorching or precure of chemical curative loaded ferrite compounds. The chemical curative loaded ferrite compounds also can "shelf scorch" prior to processing and tend to cause poor product aging characteristics because of the curative and accelerator fragments left in the compound after heat cure. Furthermore, expensive and energy wasting heat curing equipment such as steam autoclaves or continuous drum vulcanizers are not required when crosslinking with electron beam equipment.

By way of example, the Dynamitron, a high potential electron beam accelerator produced by Radiation Dynamics, Inc., Long Island, N.Y., is described in detail below to illustrate the equipment which can be used to effect curing. The Dynamitron power supply is a high frequency voltage generator which employs a patented, parallel-fed cascaded rectifier system developed by Radiation Dynamics, Inc., Long Island, N.Y. An RF oscillator feeds power to a high "Q" parallel resonance circuit consisting of an RF transformer and RF electrodes. The RF electrodes establish an electrostatic field along the length of the rectifier array. This electrostatic field is capacitively coupled to each rectifier by the corona rings. The rectifiers convert the RF potential to a DC potential. The direct current components of the rectifiers add in series to establish the desired potential at the terminal. The potential developed at the power supply terminal is impressed directly upon the acceleration column.

The acceleration column consists of an evacuated uniform field beam tube and an electron gun. The beam tube is constructed of large I.S. re-entrant stainless steel dynodes and glass insulators. The re-entrant design of the dynodes completely shields both the glass insulators and seals from radiation, providing long and maintenance-free beam tube life. Each dynode is electrically connected to a high resistance bleeder network which provides the required potential between dynodes.

The electron gun is a straightforward fixed focus device, employing a heated cathode which is mounted on insulated standoffs in a copper plate. Filament power is provided by an independent source.

Electrons emitted from the heated cathode are focussed by a Pierce lens and accelerated within the beam tube to the full DC potential of the Dynamitron cascaded rectifier system. The result is a well-defined, monoenergetic electron beam.

The oscillator converts 60 Hz line voltage to approximately 15 kV at 100 kHz. This is the RF driving power for the cascaded rectifier system.

An industrial vacuum system is provided that will rapidly develop as well as continuously maintain the vacuum conditions required within the acceleration column and beam scanner. The vacuum station is equipped with thermocouple as well as ionization gauge tube readouts and overheat protection. In addition, automatic gate valves are provided which isolate the vacuum station when required. The purpose of deflecting the beam in this manner is to produce a wide screen of uniformly distributed electrons at the product. The width of the electron screen may be adjusted to conform to product width.

This electron beam radiation should be of a voltage sufficient to achieve penetration into the product, and of a dosage, high enough to achieve the desired crosslinking. For most applications of the present invention, an electron beam accelerator should be used which is at least 1,000,000 electron volts, preferably 3,00,000 electron volts, and most preferably more than 4,000,000 electron volts.

The accelerating voltage (terminal voltage) determines the depth to which the electron beam will penetrate the material, the greater the voltage, the greater the depth of penetration. FIG. 1 shows the relationship of voltage to effective penetration. This relationship is shown for unit density materials; for materials having a relative density other than unity, physical thickness must be divided by density before determining the figure. Products such as wire and cable, thick strip and reinforced plastics may be irradiated from two opposing sides; in these cases, effective electron beam penetration is increased by a factor of 2.5. The relationship of voltage is effective penetration for two-sided irradiation is shown by FIG. 2 for unit density material.

Figure 2:
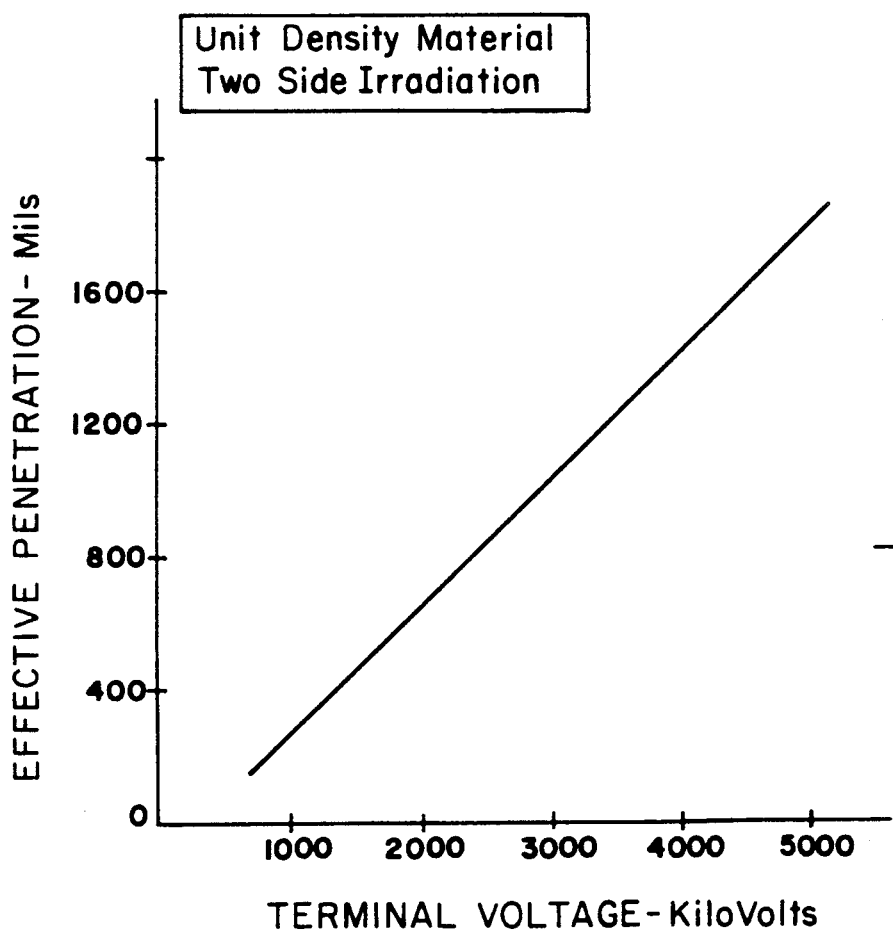
FIG. 2 is a plot of effective penetration of a unit density material versus terminal voltage for two-side irradiation with an electron beam accelerator.

As shown in FIGS. 1 and 2, the 4.5 MeV accelerator can penetrate 0.600" into a unit density material one sided and 1.500" total depth when exposed from both sides. This translates to about 0.165" depth one sided and about 0.412" penetration two sides for ferrite loaded magnetic compounds having a specific gravity of about 3.64. The effective beam curtain width is about 50" and the amperage is adjusted so that the part receives about 2.5 megarad dosage with each pass under the beam at 20 feet/minute.

For most applications it is preferable that the product is formed during the forming step into a product having a thickness or depth which is nothing more than about 0.412". Typically, for example, the shape might be a strip having a width of ¼ to 3" and a thickness of 0.030" to 0.400", or a sheet having a width of 3" to 27" and a thickness of 0.015" to 0.045".

EXAMPLE 1

This example shows the typical compounding, processing (extrusion) and electron beam curing steps of two of the preferred binder systems, each containing a highly saturated nitrile elastomer (HSN) of at least 42 percent bound acrylonitrile and a high performance ferrite, Stackpole's BG12 (specific gravity =5.38). Rheology of the compounds and extrusion conditions for 0.125"×0.375" strips are reported and the effects of electron beam curing and heat aging on the tensile properties of these strips are shown and in some instances, compared to a commercial chemically cured NBR (acrylonitrile-butadiene-42 percent bound acrylonitrile) elastomer ferrite strip designated B1030 and produced by 3M Company, St. Paul, Minn. The oil solvent and chemical resistance of these materials are also compared both with laboratory results and vendor literature references.

Samples 1A and 1B are prepared according to the following recipes in Table III.

TABLE III

| SAMPLE | 1A | 1B |
|---|---|---|
| Binder System Masterbatch | | |
| Designation | MB-A | MB-B |
| Ingredients (pph. wt.) | | |
| Zetpol 1020 | 100.00 | 0.00 |
| Therban 2207 | 0.00 | 100.00 |
| Naugard 445 | 2.00 | 2.00 |
| Vanox ZMTI | 1.00 | 1.00 |
| Struktol TR016 | 3.00 | 3.00 |
| Total PPH | 106.00 | 106.00 |
| Specific Gravity | 1.0062 | 0.9871 |
| Ferrite/Binder System Compound | | |
| Designation | 1A | 1B |
| Ingredients (pph. wt.) | | |
| MB-A | 100.00 | 0.00 |
| MB-B | 0.00 | 100.00 |
| Stackpole BG12 | 872.29 | 889.34 |
| (Sp. Grav. = 5.38) | | |
| Total PPH | 972.29 | 989.34 |
| Calc. Spec. Gravity | 3.718 | 3.711 |
| Calc. Vol. % Loading, | 62.0 | 62.0 |

The binder system masterbatches MB-A and MB-B were mixed in a Haake Rheacord System 40 Mixer, manufactured by Haake Buchler Instruments, Saddle Brook, N.J. This internal mixer has 50 cc binder volume capacity and is equipped with roller blades. The internal mixer was maintained at 140° C. during the mixing cycle and the masterbatch was discharged at a dump temperature of 155° C. On scale up, these masterbatches were also mixed in a 1200 cc Banbury using cooler body temperatures (because of increased shear heating from the Banbury blades) but still discharging at 155° C. stock temperature. Compounds 1A and 1B, containing the high performance BG12 ferrite were mixed on a 4 inch diameter two roll mill (75 cc batch size) by first banding the binder masterbatch on the mill with rolls controlled below 55° C. surface temperature, then adding the ferrite incrementally until it is fully incorporated. The completely mixed ferrite loaded compound bands well at these temperatures and can be sheeted out using roll temperatures between 23° to 50° C. Alternatively, ferrite/binder system mixing and sheeting can be done on the mill with these compounds if the fast roll is maintained at 115° C. or above and the slow roll at least 30° C. cooler than the fast roll. Strips of milled sheet compound were granulated using a Nelmor Granulator, manufactured by Nelmor Co. Inc., North Uxbridge, Mass., Model G66M1 at 3600 rpm with a ⅛ inch screen. The resulting granules were passed through a 9 mesh (U.S. Standard) screen while returning the oversize particles for regrind. The granules passing through the 9 mesh screen were then dried for 18 hours at 50° C. prior to extruding. These dried granules were used for both capillary rheology and strip extrusion runs.

Figure 3:
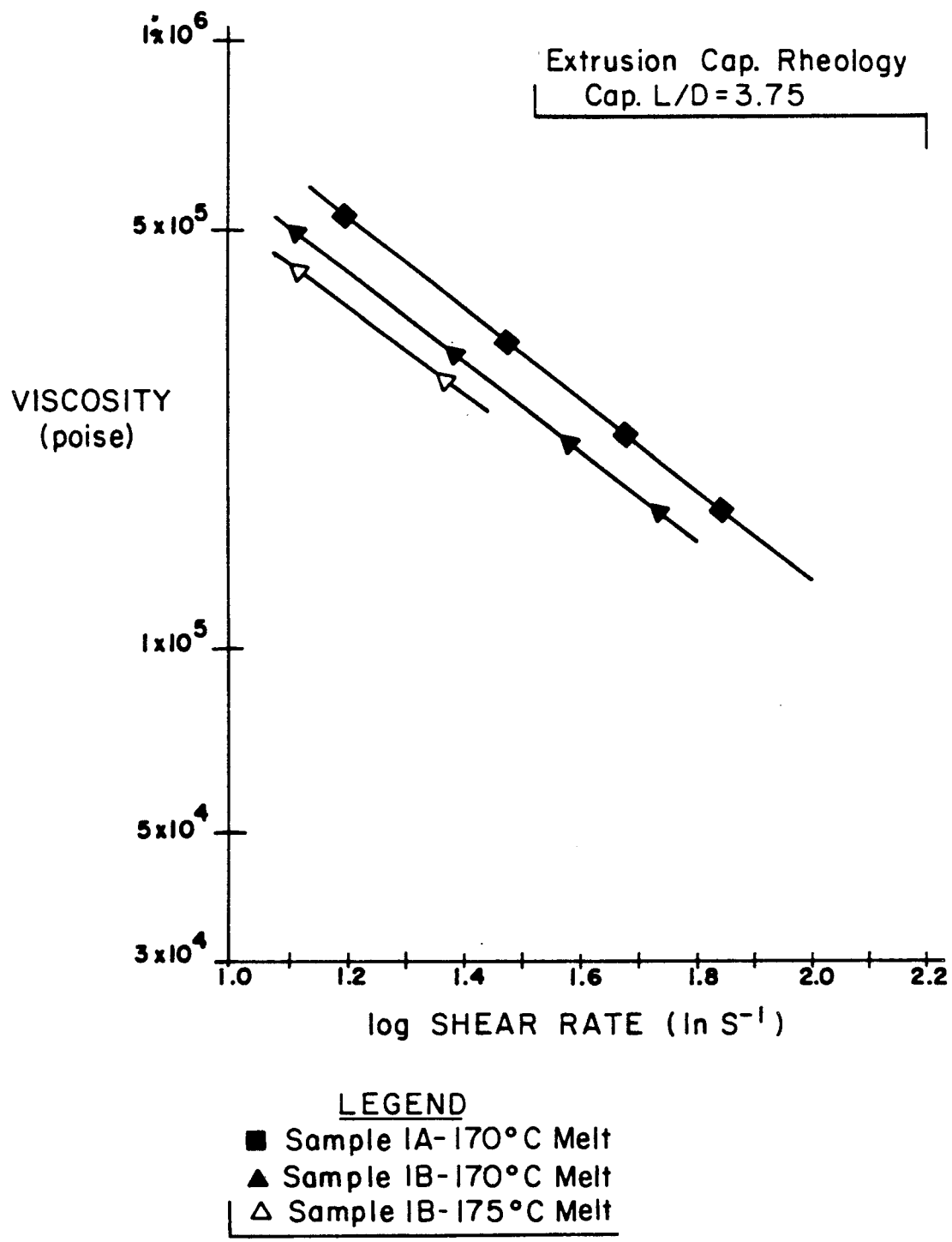
FIG. 3 is a plot of viscosity (log scale) versus log shear rate for Samples 1A and 1B of Example 1.

Capillary rheology of the two compounds 1A and 1B was run using the Haake Rheocord 40 system, equipped with a ¾ inch diameter 10:1 L/D electrically heated, air cooled extruder with a 1.5 compression ratio straight taper screw. A 0.200 inch diameter capillary 3.75 L/D die was used for rheological studies. The heating zones were set for a 170° C. melt temperature target and in one case, compound 1B, a second set of temperatures was run for a 175° C. melt target. The results are summarized in FIG. 3 where viscosity versus shear rate was plotted on a single graph for all three runs. The rheology analysis of these compounds indicates a power law fluid relationship between viscosity and shear rate, according to the formula $\eta = \eta_o/\gamma/^{n-1}$ where $\eta$ = viscosity in poise and $\gamma$ = shear rate in sec.$^{-1}$. It was found that at b 170° C. melt temperatures, n = 0.186 for the 1A compound and n = 0.222 for the 1B compound. At a typical extrusion shear rate of 30 sec.$^{-1}$, the viscosity is in the 2.5 to 3.5 × 10$^5$ poise range for both compounds, well within the processing window to both extrude the compound and to orient the ferrite particles during extrusion.

pared to the original after extended oven aging at 125° C. The comparison of the 1A and 1B strips, both cured with 5 Megarad dosage, with the conventional chemically cured conventional nitrile elastomer/binder system, 3M B1030, at different aging conditions is shown in Table V. This illustrates the improvement in the art in flexible, oil resistant bonded ferrite magnets as far as the retention of elongation properties in severe heat aging environment.

TABLE IV

| | | Cure Level, Megarads | | | | |
|---|---|---|---|---|---|---|
| | Orig. | Aged 100 Hrs. @ 125° C. | Aged 500 Hrs. @ 125° C. | Orig. | Aged 100 Hrs. @ 125° C. | Aged 500 Hrs. @ 125° C. |
| | | No Cure | | | (2.67 MR) | |
| 1A STRIP | | | | | | |
| $E_Y$, Elong @ Yield, % | 22.5 | 27.6 | 77.7 | 25.5 | 29.5 | 70.6 |
| $E_B$, Elong @ Break, % | 65.0 | 119.5 | 77.7 | 32.7 | 1020 | 70.6 |
| $T_{MAX}$, PSI | 1172 | 1303 | 1493 | 1267 | 1323 | 1527 |
| T 5%, PSI | 566 | 584 | 993 | 557 | 542 | 913 |
| 1B STRIP | | | | | | |
| $E_Y$, Elong @ Yield, % | 37.9 | 36.6 | 17.2 | 33.0 | 24.0 | 18.1 |
| $E_B$, Elong @ Break, % | 61.6 | 87.5 | 98.8 | 39.7 | 40.2 | 92.2 |
| $T_{MAX}$, PSI | 952 | 1221 | 1501 | 1130 | 1425 | 1553 |
| T 5%, PSI | 482 | 483 | 968 | 475 | 575 | 760 |
| | | (5.33 MR) | | | (8.00 MR) | |
| 1A STRIP | | | | | | |
| $E_Y$, Elong @ Yield, % | 22.9 | 29.1 | 46.4 | 17.6 | 21.7 | 56.3 |
| $E_B$, Elong @ Break, % | 26.5 | 92.4 | 46.4 | 17.6 | 76.9 | 56.3 |
| $T_{MAX}$, PSI | 1372 | 1467 | 1814 | 1371 | 1532 | 1766 |
| T 5%, PSI | 541 | 678 | 1040 | 699 | 697 | 1085 |
| 1B STRIP | | | | | | |
| $E_Y$, Elong @ Yield, % | 24.8 | 27.0 | 10.4 | 19.3 | 15.1 | 15.3 |
| $E_B$, Elong @ Break, % | 24.8 | 62.4 | 48.4 | 19.3 | 22.3 | 68.8 |
| $T_{MAX}$, PSI | 1495 | 1396 | 1842 | 1356 | 1690 | 1674 |
| T 5%, PSI | 622 | 479 | 1173 | 560 | 768 | 1041 |

Crosshead speed = 5"/min. on Instron Machine
Average of 3 values, samples conditioned to 23° C. and 50 percent RH.

Besides measuring capillary rheometry, a series of extrusions with samples 1A and 1B, using the same ¾ inch diameter 10:1 L/D extruder with a 1.5 compression ratio straight taper screw, were made using a short land length low shear die with a 0.375 inch wide ×b 0.125 inch thick opening. Sample 1A was extruded at an average feed rate of 6.51 pounds per hour, an average die pressure of 1721 psig and an average melt temperature of b 161° C. Sample 1B extruded best at a lower melt temperature, 157° C., at an average die pressure of 1286 psig at a similar feed rate. Both strips had minimum "draw" tension when exiting the die and had finished dimensions of 0.120 inch thick × 0.375 inch wide after cooling to room temperature.

The 1A and 1B strips were subjected to different dosage levels of electron beam radiation prior to tensile testing. A 4.5 MeV electron beam accelerator, located at E. Beam Services, Inc., Cranbury, N.J., was used for curing these strips by exposing the strip one-sided through the 0.120 inch dimension. These strips were exposed to one, two and three passes at 20 feet per second corresponding to 2.67, 5.35 and 8.00 megarad dosages, respectively. These strips plus the original uncured samples were tested for tensile properties unaged as well as hot air oven-aged 100 hrs. at 125° C., and 500 hrs. at 125° C. The tensile properties were measured at 5 inch/minute crosshead speed, at 23° C. and 50 percent RH and included elongation at yield (Ey), Elongation at break ($E_B$), maximum tensile strength ($T_{MAX}$) and modulus at 5 percent strain ($T_5$%) The results are reported in Table IV. Both of the 1A and 1B strips showed rather remarkable elongation properties com-

TABLE V

| | Orig. | Aged 100 Hrs @ 125° C. | Aged 500 Hrs. @ 125° C. | Aged 6480 Hrs. @ 100° C. |
|---|---|---|---|---|
| | | 1A Extruded Strip 5.33 MR Dosage | | |
| $E_Y$, Elong. @ Yield, % | 22.9 | 29.1 | 46.4 | 45.4 |
| $E_B$, Elong. @ Break, % | 26.5 | 92.4 | 46.4 | 45.5 |
| $T_{MAX}$, PSI | 1372 | 1467 | 1814 | 2286 |
| $T_{5\%}$, PSI | 541 | 678 | 1040 | 1577 |
| | | 1B Extruded Strip 5.33 MR Dosage | | |
| $E_Y$, Elong. @ Yield, % | 24.8 | 27.0 | 10.4 | 9.1 |
| $E_B$, Elong. @ Break, % | 24.8 | 62.4 | 48.4 | 47.9 |
| $T_{MAX}$, PSI | 1495 | 1396 | 1842 | 1763 |
| $T_{5\%}$, PSI | 622 | 479 | 1173 | 1302 |
| | | Conventional Sulfur Cure NBR Binder System 3M - B 1030 | | |
| $E_Y$, Elong. @ Yield, % | 31.4 | 6.0 | 1 | 1 |
| $E_B$, Elong. @ Break, % | 31.4 | 6.0 | 1 | 1 |
| $T_{MAX}$, PSI | 832 | 850 | 1 | 1 |
| $T_{5\%}$, PSI | 460 | 814 | 1 | 1 |

[1] Too brittle for tensile test, breaking elongation less than 2.0 percent

Solvent, Oil and Chemical Resistance of Cured Extruded Compounds

Extruded strips of Samples 1A and 1B were exposed to 5.33 megarad electron beam dosage to cure, and along with cured strips of ferrite magnetic nitrile rubber composition (i.e., B1030 sold by Minnesota Mining and (3M) were immersed in a selection of eight solvents and oils for 46 hours at 23° C. The volume swell of these strips is shown in Table VI.

The results show that resistance to oils and aliphatic hydrocarbons is at least equivalent to the commercial precured NBR bonded ferrite system (bound acrylonitrile estimated at 42 percent). Besides these soaking tests, one of the HSN vendors, Zeon Chemicals Inc., has provided a table which further differentiates the two binder systems, HSN and NBR, in their resistance to a variety of chemicals. This is shown in Table VII. This table indicates that HSN binder systems have definite advantages over NBR in their resistance to steam, certain acids and bases, amines, and oxidizing agents. In addition, if the binder systems are exposed to these solvents or chemicals at elevated temperatures, the HSN binder shows even more advantage over the NBR binder.

TABLE VI

SOLVENT SOAK TESTS (46 HOURS AT 23° C.)

| Sample | 1A | 1B | B1030 Commercial (NBR Binder System) |
|---|---|---|---|
| Cure | 5.33 MR-E BEAM | 5.33 MR-E BEAM | Chemical/Heat Cure |
| Sample Size | ⅜" × .118" × 1" | ⅜" × .114" × 1" | ¼" × .087" × 1" |
| Sample Form | Extruded Strip | Extruded Strip | Laminated Strip |
| Volume % Swell (46 Hrs. @ 23° C.) | | | |
| (1) Toluene | 51.2 | 68.5 | 55.9 |
| (2) Fuel C$^1$ | 24.7 | 27.9 | 24.0 |
| (3) Heptane | 1.8 | 3.3 | 5.6 |
| (4) ASTM Oil #1 | 1.2 | 0.6 | 0.6 |
| (5) ASTM Oil #3 | 0.3 | 0.5 | 0.7 |
| (6) 2-Propanol | 3.1 | 3.6 | 3.9 |
| (7) MEK | 88.3 | 137.1 | 61.1 |
| (8) 1,1,1 Trichloroethane | 67.6 | 112.1 | 55.3 |

$^1$50 percent isooctane, 50 percent toluene

TABLE VII

CHEMICAL RESISTANCE OF HIGHLY SATURATED NITRILES (HSN) COMPARED TO STANDARD NITRILE RUBBERS (NBR)

| | Fluid | HSN | NBR |
|---|---|---|---|
| | Steam (150° C./302° F.) | B | U |
| Organic Acid: | Acetic Acid (30%) | B | B |
| Acid: | Hydrochloric Acid (25%) | A | B |
| | Phosphoric Acid (20%) | A | B |
| | Nitric Acid (25%) | B | U |
| Alkali: | Sodium Hydroxide (30%) | A | B |
| | Aqueous Ammonia (28%) | A | A |
| Salt: | Sodium Chloride (30%) | A | A |
| | Sodium Carbonate (10%) | A | A |
| Oxidizing Agent: | Hydrogen Peroxide (3%) | B | C |
| | Sodium Hypochlorite (5%) | B | U |
| Aliphatic Hydrocarbon: | Iso Octane | A | A |
| Aromatic Hydrocarbon: | Toluene | C | C |
| Chlorinated Hydrocarbon: | Trichloroethylene | C | C |
| Alcohol: | Methyl Alcohol | A | A |
| | Ethyl Alcohol | A | A |
| Ether: | Ethyl Ether | C | C |
| Ester: | Ethyl Acetate | U | U |
| Ketone: | Methyl Ethyl Ketone | U | U |
| Aldehyde: | Furfural | B | C |
| Amine: | Triethanol Amine | A | C |
| | Carbon Disulfide | C | C |

A = Recommended - little or minor effect
B = Minor to moderate effect
C = Moderate to severe effect
U = Not recommended

EXAMPLE 2

This example shows the difference in tensile, aging and solvent resistance properties of two widely different HSN polymer binder systems for the high performance Stackpole BG12 ferrite, the HSN polymer in sample 2A containing Zetpol 1020 (44 percent bound ACN, percent saturation=90) and sample 2B containing the highly saturated, low acrylonitrile HSN polymer Zetpol 2000L (36 percent bound ACN, percent saturation=99). The compounds 2A and 2B were prepared according to the recipe in Table VIII. Both samples have reduced lubricant levels (1 part versus 3 parts Stuktol TR016) compared to Examples 1A and 1B.

TABLE VIII

| SAMPLE | 2A | 2B |
|---|---|---|
| Binder System Masterbatch | | |
| Designation | MB-2A | MB-2B |
| Ingredients (pph, wt.) | | |
| Zetpol 1020 | 100.00 | 0.00 |
| Zetpol 2000L | 0.00 | 100.00 |
| Naugard 445 | 2.00 | 2.00 |
| Vanox ZMTI | 1.00 | 1.00 |
| Struktol TR016 | 1.00 | 1.00 |
| Total PPH | 104.00 | 104.00 |
| Specific Gravity | 1.0063 | 0.9868 |
| Ferrite/Binder System Compound | | |
| Designation | 2A | 2B |
| Ingredients (pph, wt.) | | |
| MB-2A | 100.00 | 0.00 |
| MB-2B | 0.00 | 100.00 |
| Stackpole BG12 | 872.29 | 889.53 |
| (SP. Grav. = 5.38) | | |
| Total PPH | 972.29 | 989.53 |
| Calc. Spec. Gravity | 3.718 | 3.711 |
| Calc. Vol. % Loading, Ferrite | 62.0 | 62.0 |

The compound batches 2A and 2B were prepared, mixed, sheeted out, and granulated according to the procedures outlined in Example 1. The minus 9 mesh granules were extruded through the same extruder and die used for the compounds in Example 1 resulting in an extruded strip 0.120 inches thick by ⅜ inches wide. Compound 2A was extruded at a feed rate of 10.65 pounds per hour at a melt temperature of b 151° C., resulting in an average die pressure of 2387 psig. Compound 2B was extruded at a feed rate of 12.34 pounds per hour at a melt temperature of 148° C., resulting in an average die pressure of 2024 psig. Tensile properties were obtained before and after electron beam curing with the E-Beam Services, Inc., 4.5 MeV electron beam accelerator—strip 2A at 2.5 megarads and strip 2B at 5.0 megarads. (Note that the 2B compound requires more radiation dosage for crosslinking because of the highly saturated polymer backbone of Zetpol 2000L). Radiation cured strips of 2A and 2B were also hot air oven aged 100 hours at 125° C. and 150° C., respectively, and tested for tensile properties. The results are shown in Table IX.

TABLE IX

|  | As Extruded (No Cure) | Original (No Aging) | Hot Air Aged 100 Hrs. @ 125° C. | Hot Air Aged 100 Hrs. @ 150° C. |
|---|---|---|---|---|
| Extruded 2A Strip | | Electron Beam Cured At 2.5 Megarads/One Side | | |
| $E_Y$, Elong @ Yield, % | 32.4 | 16.1 | 18.2 | 47.7 |
| $E_B$, Elong @ Break, % | 174.0 | 97.4 | 79.6 | 47.7 |
| $T_{MAX}$, PSI | 1096 | 1265 | 1287 | 1661 |
| T 5%, PSI | 540 | 770 | 889 | 1061 |
| Extruded 2B Strip | | Electron Beam Cured At 5.0 Megarads/One Side | | |
| $E_Y$, Elong @ Yield, % | 17.1 | 18.0 | 13.5 | 15.0 |
| $E_B$, Elong @ Break, % | 41.7 | 28.6 | 134.3 | 77.7 |
| $T_{MAX}$, PSI | 898 | 1049 | 1252 | 1264 |
| T 5%, PSI | 574 | 592 | 869 | 1054 |

Crosshead Speed = 5"/min. on Instron Machine, Average of 3 tests
Samples conditioned and tested at 23° C. and 50 percent RH According to the tensile elongation at break, the highly saturated HSN binder system compound 2B shows better heat aging resistance at 150° C. and for this reason, is usually recommended for higher temperature applications.

For solvent resistance, the volume percent swell of 2A and 2B strip was determined after 46 hours at 23° C. using the same solvents and oils as Example 1. In this case, however, the radiation dosage was varied to determine the effect of the amount of crosslinking on solvent and oil resistance. The results are shown in Table X with the commercial chemically cured NBR/ferrite compound, 3M's B1030, run again in this series as a control.

TABLE X

| Solvent Soak Tests (46 Hours at 23° C.) | | | |
|---|---|---|---|
| SAMPLE: | 2A | | |
| SAMPLE SIZE: | 1" × .120 × 1" | | |
| SAMPLE FORM: | Extruded Strip | | |
| Volume % Swell | Electron Beam Dosage | | |
| (46 Hrs. @ 23° C.) | OMR | 2.5 MR | 5.0 MR |
| (1) Toluene | 62.0 | 56.6 | 50.9 |
| (2) Fuel C[1] | 25.0 | 25.0 | 23.8 |
| (3) Heptane | 0.4 | 0.5 | 0.6 |
| (4) ASTM Oil #1 | 0.9 | 0.8 | 0.8 |
| (5) ASTM Oil #3 | 1.3 | 0.9 | 0.8 |
| (6) 2 Propanol | 1.8 | 1.8 | 1.7 |
| (7) MEK | DIS[2] | 111.2 | 79.9 |
| (8) 1,1,1 Trichloroethane | DIS[2] | 58.1 | 60.9 |
| SAMPLE: | 2B | | |
| SAMPLE SIZE: | 1" × .121 × 1" | | |
| SAMPLE FORM: | Extruded Strip | | |
| Volume % Swell | Electron Beam Dosage | | |
| (46 Hrs. @ 23° C.) | OMR | 5.0 MR | 7.5 MR |
| (1) Toluene | DELAM[3] | 86.9 | 74.2 |
| (2) Fuel C[1] | 39.9 | 37.6 | 36.7 |
| (3) Heptane | 3.6 | 3.6 | 2.5 |
| (4) ASTM Oil #1 | 0.9 | 0.8 | 0.8 |
| (5) ASTM Oil #3 | 1.8 | 1.1 | 1.3 |
| (6) 2 Propanol | 2.7 | 2.7 | 2.7 |
| (7) MEK | DIS[2] | 121.4 | 89.3 |
| (8) 1,1,1 Trichloroethane | DIS[2] | 136.3 | 100.5 |
| SAMPLE | 2C 3MB1030 (NBR Binder System) | | |
| SAMPLE SIZE: | 1" × .087" × 1" | | |
| SAMPLE FORM: | Laminated Strip | | |
| Volume % Swell | | | |

TABLE X-continued

| Solvent Soak Tests (46 Hours at 23° C.) | |
|---|---|
| (46 Hrs. @ 23° C.) | Chemical/Heat Cure |
| (1) Toluene | 55.8 |
| (2) Fuel C[1] | 29.6 |
| (3) Heptane | 3.9 |
| (4) ASTM Oil #1 | 1.2 |
| (5) ASTM Oil #3 | 1.4 |
| (6) 2 Propanol | 4.1 |
| (7) MEK | 55.9 |
| (8) 1,1,1 Trichloroethane | 57.0 |

[1]50 percent isooctane, 50 percent toluene
[2]Disintegrated during test
[3]Delaminated during test The increased crosslinking due to higher electron beam dosage shows up as much lower swell, particularly in solvents that are not usually recommended for the HSN binder systems. The 2A strip, having a higher acrylonitrile content in its binder system than 2B, shows a significant advantage over 2B in its resistance to aliphatic and aromatic hydrocarbon solvents, ASTM oils and other organic solvents and compares very favorably with the chemically cured high acrylonitrile (42 percent) NBR/ferrite laminated strip (3M 1030), especially at the higher electron beam dosage.

On the other hand, extruded strip 2B has better cold use temperatures, with a Gehman freeze point (ASTM D1053) of −33.8° C. versus −26.2° C. for strip 2A. Therefore, a magnetic device designer would be able to select the proper combination of oil and solvent resistance, high maximum temperature use and minimum cold temperature use by specifying the type of HSN binder used in the ferrite compound.

EXAMPLE 3

This sample represents a semi-works scale process for a preferred HSN binder system with the Stackpole BG12 ferrite, compound 3A, resulting in an extrusion of strip through a rectangular cross section die (0.225 inches thick ×1.500 inches wide) at 60.9 Kg/hr. (134 #/hr.). In this example the die has shear orientation and magnetic field induction capabilities to orient the ferrite particles in their preferred magnetic orientation in the thickness direction (i.e. through the thickness). Two different "draw" conditions were imposed on the strip exiting the die by varying the takeup speed as follows: 3A-A strip was the minimum tension consistent with the continuous extrusion process and 3A-B strip was run at a 10 percent increase in takeup speed. This range of "draw" is about the maximum expected in situations where draw down is required to meet finished product specifications. The effects of subsequent electron beam curing and oven heat aging (125° C.) on such properties as magnetic hysteresis properties, dimensional stability (permanent dimensional change from heat exposure), tensile properties and solvent resistance are shown in this example. The thickness of strip (over 0.210 inches) is such that the orientation of BG-12 ferrite cannot be obtained by shear alone (i.e. an induced magnetic field is required) and the strip must be exposed on both sides with electron beam radiation from the 4.5 MeV accelerator since effective penetration through a 3.64 gm/cm$^3$ strip would be 0.165 inches (i.e. 0.600"/3.64) when exposing from one side.

Compound 3A was prepared according to the formulas and procedures listed below. This composition is almost identical to composition 2A from Example 2.

| Binder System Masterbatch: MB-3A Ingredients (pph, wt.) | |
|---|---|
| Zetpol 1020 | 100.00 |
| Naugard 445 | 2.00 |
| Vanox ZMTI | 1.00 |
| Struktol TR016 | 1.00 |
| Total pph | 104.00 |
| SP Gravity = | 1.0063 |

The binder system was masterbatched in a 13,675cc capacity banbury by masticating 13.232 Kg of Zetpol 1020 first, then adding sequentially, 0.264 Kg of Naugard 445 plus 0.132 Kg of Vanox ZMTI at 1.7 minutes, 0.066 Kg of Struktol TR016 at 4 minutes, another 0.066 Kg of Struktol TR016 at 6 minutes, then continuing mixing to a 10 minute dump time - the maximum temperature reached during mixing was 171° C. The masterbatch binder system was sheeted off on a mill using mill temperatures indicated in Example 1.

| Ferrite/Binder System Compound 3A Ingredients (pph, wt.) | |
|---|---|
| MB-3A | 100.00 |
| Stackpole BG12 @ 5.39 Specific Gravity | 873.91 |
| Total pph = | 973.91 |
| Calculated Specific Gravity = | 3.724 |
| Calculated Volume % loading of ferrite = | 62.0 |

A 22 inch diameter two roll mill was used for mixing a 50.55 Kg batch of 3A compound. The fast roll (20 rpm) was maintained at 121° C. to start and recorded 138° C. at the completion of mixing while the slow roll (13.33 rpm) was maintained below 100° C. throughout the run. Complete mixing and banding (on the slow roll) was accomplished in 12 minutes, then the compounded sheets were cooled and granulated in similar fashion to that described in Example 1. These granules were used as feed for the extruded strip.

EXTRUSION

The granules were extruded using a 2.5 inch diameter, 16:1 L/D extruder with a 1.05 compression ratio straight taper screw. Temperatures zones were adjusted so that a melt temperature of 165 to 167° C. was maintained at 60.9 Kg/hr. (134 #/hr.) feed rate. The die had a 0.225 inch × 1.500 inch rectangular opening and had shear orienting capabilities as well as a field of 12,000 oersteds directed through the thickness of the part. The takeup system was run at two different speeds resulting in the following specifications for strip 3A-A and 3A-B.

| | 3A-A | 3A-B |
|---|---|---|
| Die pressure, psig | 4500 | 4000 |
| Takeoff speed, feet/min. | 4.23 | 4.65 |
| Dimensions of Strip | | |
| thickness, T, in. | 0.224 | 0.212 |
| width, W, in. | 1.490 | 1.402 |
| Specific Gravity | 3.64 | 3.64 |

Samples were cut to 12 inch lengths which were then exposed to electron beam curing using E. Beam Services 4.5 MeV accelerator for 2 passes at 2.5 megarad dosage each. The samples were flipped over, and had two additional passes of 2.5 megarad dosage exposure. This amounted to 5 Megarad dosage each side, a total of 10 Megarad dosage (designated 5 MR/2 sides in the Tables). The following properties were investigated.

TABLE XI

MAGNETIC HYSTERESIS PROPERTIES

| | No Cure | | Electron Beam Cured 5 MR/2 Sides | |
|---|---|---|---|---|
| | Orig. | Aged 100 Hrs @ 125° C. | Orig. | Aged 100 Hrs @ 125° C. |
| 3A-A | | | | |
| Br, gauss | 2630 | 2630 | 2660 | 2610 |
| Hc, oersteds | 2225 | 2220 | 2250 | 2225 |
| BHmax megagauss oersteds | 1.65 | 1.65 | 1.68 | 1.63 |
| Hci oersteds | 3995 | 3975 | 4025 | 4030 |
| 3A-B | | | | |
| Br, gauss | 2620 | 2610 | 2650 | 2590 |
| Hc, oersteds | 2220 | 2230 | 2230 | 2210 |
| BHmax, megagauss oersteds | 1.62 | 1.64 | 1.68 | 1.60 |
| Hci, oersteds | 3985 | 4000 | 3985 | 3975 |

Table XI shows that the 3A compound was sufficiently fluid to obtain excellent magnetic orientation during extrusion and that electron beam curing and/or 125° C. aging exposure has only ver minimal effect on magnetic properties.

Dimensional Stability

Twelve inch lengths of 3A-A and 3A-B strips, both uncured and cured 5 MR/2 sides, were measured at 23° C. before and after exposure to 125° C. heat aging (100 hours) and the permanent dimensional change in all directions, thickness (T), width (W) and length (L) was claculated based on original dimensions and recorded in Table XII. A + sign indicates a dimensional gain, while a — sign indicates a dimensional loss (shrinkage).

TABLE XII

| | No Cure Perm. Dimensional Change After 100 Hrs. @ 125° C. (in/in) | 5 MR/2 Sides Perm. Dimensional Change After 100 Hrs. @ 125° C. (in/in) |
|---|---|---|
| 3A-A | | |
| T, in/in | +11.08 × 10$^{-3}$ | +1.32 × 10$^{-3}$ |
| W, in/in | +4.84 × 10$^{-3}$ | +0.42 × 10$^{-3}$ |
| L, in/in | −13.99 × 10$^{-3}$ | |
| 3A-B | | |
| T, in/in | +13.08 × 10$^{-3}$ | +1.88 × 10$^{-3}$ | conventional chemically cured NBR bonded ferrite system, 3M B1030, again included for comparison.

TABLE XIV

| | SOLVENT SOAK TESTS (VOLUME % SWELL 46 HRS. @ 23° C.) | | |
|---|---|---|---|
| Sample | 3A-A No Cure | 3A-A 5 MR/2 Sides | 3M B1030 |
| Sample Size, in. | 0.5 × 0.224 × 1 | 0.5 × 0.224 × 1 | 0.5 × 0.087 × 1 |
| Vol. % Swell (46 hrs. @ 23° C.) | | | |
| (1) Toluene | 62.8 | 41.3 | 55.8 |
| (2) Fuel C[1] | 18.8 | 14.3 | 29.6 |
| (3) Heptane | 0.6 | 0.3 | 3.9 |
| (4) ASTM Oil #1 | 1.0 | 0.4 | 1.2 |
| (5) ASTM Oil #3 | 0.8 | 0.4 | 1.4 |
| (6) 2 Propanol | 1.2 | 1.1 | 4.1 |
| (7) MEK | DIS[2] | 57.8 | 55.9 |
| (8) 1,1,1 Trichloroethane | DIS[2] | 31.3 | 57.0 |

[1] 50 percent isooctane, 50 percent toluene
[2] Disintegrated

| | No Cure Perm. Dimensional Change After 100 Hrs. @ 125° C. (in/in) | 5 MR/2 Sides Perm. Dimensional Change After 100 Hrs. @ 125° C. (in/in) |
|---|---|---|
| W, in/in | $+9.99 \times 10^{-3}$ | $+0.86 \times 10^{-3}$ |
| L, in/in | $-21.97 \times 10^{-3}$ | $-2.33 \times 10^{-3}$ |

The results in Table XII show that both uncured samples have considerable "locked-in" stress which is relieved or "annealed" during heat aging. The 3A-B strip has considerably more dimensional change than the 3A-A strip because of more "locked in" stress due to drawdown from the die. However, when the samples are electron beam cured before the 125° C. exposure, the permanent change is almost negligible, amounting to less than 15 percent of the permanent dimensional change observed with the uncured strips.

Tensile Strenoth

Both 3A-A and 3A-B strips cured 5MR/2 sides were tested for tensile properties before and after hot air oven aging of 100 hours at 125° C. The tensile tests were run at 23° C., 50 percent RH, as in Examples 1 and 2 using ½ inch wide strips, tested in the direction of extrusion. The results are shown in Table XIII below.

TABLE XIII

| | Electron Beam Exposure | |
|---|---|---|
| | 5 MR/2 Sides No Aging | 5 MR/2 Sides Hot Air Aged 100 Hrs. @ 125° C. |
| 3A-A | | |
| $E_Y$, Elong. Yield, % | 18.2 | 14.6 |
| $E_B$, Elong. Break, % | 23.3 | 45.5 |
| $T_{MAX}$, PSI | 1993 | 2047 |
| $T_{5\%}$, PSI | 772 | 1278 |
| 3A-B | | |
| $E_Y$, Elong. @ Yield, % | 15.5 | 11.8 |
| $E_B$, Elong. @ Break, % | 25.2 | 40.6 |
| $T_{MAX}$, PSI | 2153 | 2183 |
| $T_{5\%}$, PSI | 908 | 1205 |

The results indicate a slightly higher tensile strength and modulus for 3A-A and 3A-B than sample 2A in Example 2 but still very good elongation at break of over 40 percent after 100 hours @125° C.

Solvent and Oil Resistance

Sample strips of 3A-A, both uncured and electron beam cured 5 MR/2 sides, were soaked in the 8 solvents and oils for 46 hours @23° C. and the volume swell measured. The results are shown in Table XIV with the The solvent soak results show that the solvent resistance of the HSN/ferrite compound strip 3A-A improves considerably with electron beam exposure at this dosage level in all solvents tested. The electron beam cured 3A-A strip is also better in solvent resistance than the 3M B1030 in almost every solvent or oil tested.

EXAMPLE 4

Example 4 uses an 80/20 (weight) blend of a highly saturated butadiene-nitrile elastomer (HSN) with a compatible thermoplastic polymer, Barex 210. Barex 210 is an impact modified acrylonitrile-methylacrylate copolymer barrier resin of a specific gravity 1.5, produced and sold by B.P. Chemicals International, Cleveland, Ohio. The 80 percent Zetpol 1020, 20 percent Barex 210 polymer combination is blended with antidegradants and processing aids in an internal mixer, dumped at 340° F. (171° C.) and sheeted off on a mill maintained at 250° F. (121° C.) fast roll, 190° F. (88° C.) slow roll to produce the masterbatch binder system of composition MB-4A shown in Table XV. The high quality ferrite, Stackpole,s BG-10, is blended into the binder system using the same mill temperatures as noted for the binder masterbatch above using the recipe for 4A shown in Table XV. As a comparison, compound 2A, containing all Zetpol 1020 polymer and Stackpole BG12 ferrite powder, was mixed and prepared as shown in Example 2, compound 2A. Both ferrite loaded compounds were then processed into 0.033–0.035" thick sheet by calendering at roll temperatures simulating the milling procedure, then 6 sheets were laminated in a mold using 330° F. (165° C.) temperature and 1000 psig pressure, then cooled under pressure to below 120° F. (50° C.) before removing the laminated part. The laminates were then subjected to two-sided electron beam radiation at 5 megarads per side—10 megarads total dosage using the 4.5 MeV accelerator at E Beam Service, Inc. Cranbury, N.J. before testing for magnetic and other properties. A summary of sheet and laminate dimensions and magnetic properties is shown in Table XVI.

TABLE XV

| Sample | 4A | 2A |
|---|---|---|
| Binder System Masterbatch | | |
| Designation | MB-4A | MB-2A |
| Ingredients (pph. wt) | | |
| Zetpol 1020 | 80.00 | 100.00 |
| Barex 210 | 20.00 | 0.00 |
| Naugard 445 | 2.00 | 2.00 |
| Vanox ZMTI | 1.00 | 1.00 |

TABLE XV-continued

| Sample | 4A | 2A |
|---|---|---|
| Struktol TR016 | 1.00 | 1.00 |
| Total pph | 104.00 | 104.00 |
| Calc. Spec. Gravity | 1.0324 | 1.0063 |
| Ferrite/Binder System Compound | | |
| Designation | 4A | 2A |
| Ingredients (pph, wt) | | |
| MB-4A | 100.00 | 0.00 |
| MB-2A | 0.00 | 100.00 |
| Stackpole BG-12 | 0.00 | 872.29 |
| (sp. grav = 5.38) | | |
| Stackpole BG-10 | 850.24 | 0.00 |
| (sp. grav. = 5.38) | | |
| Total, pph | 950.24 | 972.29 |
| Calc. Sp. Gravity | 3.727 | 3.718 |
| Calc Vol %, Ferrite | 62.0 | 62.0 |

TABLE XVI

| Sample | 4A Laminate | 2A Laminate |
|---|---|---|
| Thickness calendered sheet, in. | .035 | .033 |
| Thickness of 6 laminated | .196 | .188 |
| Electron Beam Curing | 5 MR/2 sides | 5 MR/2 sides |
| Magnetic Properties | | |
| Br, gauss | 2510 | 2650 |
| Hc, Oersteds | 2090 | 2255 |
| BH$_{max}$, megagauss-oersteds | 1.46 | 1.67 |
| Hci, oersteds | 2850 | 3575 |

Table XVI shows that both the Stackpole BG-10 and BG12 ferrite powders will shear orient very well through a calendering operation to near their maximum potential as outlined in Table II, as long as the sheet is thinner than about 0.40" (1.02 mm) and that subsequent laminating of several of these sheets in a confined mold will maintain this orientation. The BG12 ferrite shows its expected superiority over BG10 ferrite in this example.

One objective of the alloy binder masterbatch/-ferrite compound 4A was to increase the stiffness of the product which is required to maintain structural support in hot water at temperatures of 150°–160° F. (66°–71° C.). The stiffness comparison can be closely simulated by measuring the Shore D hardness at a range of temperatures. This is shown in FIG. 4 for both the alloyed binder/ferrite laminate 4A and the straight HSN binder/ferrite laminate 2A.

The substantial improvement in stiffness of the 4A compound over the 2A compound is very noticeable up to the heat distortion temperature of Barex 210 of 165° F. (ASTM D648 @66 psi). This compound still maintains a much higher stiffness than the unalloyed compound up to temperatures of 200° F. (93° C.). In addition it would be expected that the 4A compound have better resistance to a variety of solvents and chemicals than the 2A compound due to the presence of Barex 210 in the binder system.

While in accordance with the Patent Statutes, the best mode and preferred embodiment has been set forth, the scope of the invention is not limited thereto, but rather by the scope of the attached claims.

What is claimed is:

1. A flexible magnetic blend composition having a maximum energy product of at least 1.0 megagauss-oersteds; a remenance, Br, of at least about 2,000 gauss; a coercive force, Hc, of at least about 1800 oersteds; an intrinsic coercivity, Hci, of at least about 2,000 oersteds; said composition comprising a mixture of magnetic particles in an elastomeric or a thermoplastic polymeric binder, said magnetic particles being selected from the group consisting of strontium ferrite and barium ferrite, and said binder comprising a highly saturated nitrile rubber, said composition after shaping and curing by exposure to a high voltage electron beam being able to retain at least about 20 percent tensile elongation at break measured at 23° C. (ASTM D412) after 100 hours of hot air aging at 125° C., and swell less than about 5 volume percent in ASTM #1 and #3 oils after 46 hours soak at 23° C., said mixture further being capable of being shaped or formed in an extruded strip or calendered sheet which will hold its shape before and after high voltage electron beam cure.

2. A flexible magnetic blend composition as set forth in claim 1, wherein said magnetic particles are present at about at least 55 percent by volume of the blend composition.

3. A flexible magnetic blend composition as set forth in cliam 2, wherein said thermoplastic polymeric binder comprises at least about 70 percent by weight of a highly saturated nitrile rubber.

4. A flexible magnetic blend composition as set forth in claim 3, wherein said highly saturated nitrile rubber has a bound acrylonitrile content of from about 30 to about 50 percent by weight.

5. A flexible magnetic blend composition as set forth in claim 4, wherein said highly saturated nitrile rubber has a bound acrylonitrile content of from about 34 to about 48 percent by weight.

6. A flexible magnetic blend composition as set forth in claim 5, wherein said highly saturated nitrile rubber has a nitrile content of from about 36 to about 45 percent by weight.

7. A flexible magnetic blend composition as set forth in claim 3, wherein said highly saturated nitrile rubber is at least about 85 percent saturated.

8. A flexible magnetic blend composition as set forth in claim 7, wherein said highly saturated nitrile rubber is at least about 90 percent saturated.

9. A flexible magnetic blend composition as set forth in claim 2, wherein said magnetic particles comprise at least 50 percent by volume of said blend composition and have an average particle size from about 0.7 to about 2.5 microns.

10. A flexible magnetic blend composition as set forth in claim 9, wherein said magnetic particles have an average particle size from about 0.8 to about 1.6 microns.

11. A flexible magnetic blend composition as set forth in claim 3, wherein said thermoplastic polymeric binder further comprises up to about 30 percent by weight of an impact modified acrylonitrile-methylacrylate thermoplastic copolymer.

12. A flexible magnetic blend composition as set forth in claim 3, wherein said polymer further comprises up to about 30 percent by weight of a peroxide curable epichlorohydrin-ethylene oxide elastomer.

13. A process for forming a magnetic blend composition comprising:
  mixing a polymeric binder system substantially comjprising highly saturated nitrile rubber and ferrite magnetic particles to form a mixture;
  shaping a form from said mixture by caldenering ormolding; and
  curing said mixture in said form by exposing said mixture to an electron beam.

14. A process as set forth in claim 13, wherein said ferrite magnetic particles comprise at least about 55 percent by volume of said mixture.

15. A process as set forth in claim 14, wherein a further step of orienting the ferrite particles in the preferred magnetic orientation is included prior to said curing step.

16. A process as set forth in claim 13, wherein the electron beam is produced by an accelerator having a voltage of at least about 1,000,000 electron volts.

17. A process as set forth in claim 13, wherein said composition is cured by electron beam radiation dosage of at least about 2.5 megarads.

18. A process as set forth in claim 15, wherein said polymeric binder system comprises at least one polymer which is at least 70 percent by weight of a highly saturated nitrile rubber.

19. A process as set forth in claim 18, wherein said highly saturated nitrile rubber has a bound acrylonitrile content from about 30 to about 50 percent by weight and is at least about 85 percent saturated.

20. A process as set forth in claim 19, wherein said highly saturated nitrile rubber has a bound acrylonitrile content from about 36 to about 48 percent by weight and is at least about 90 percent saturated.

21. A process as set forth in claim 18, wherein said polymeric binder system further comprises up to about 30 percent by weight of an impact modified acrylonitrile-methylacrylate thermoplastic copolymer.

22. A process as set forth in claim 18, wherein said polymeric binder system further comprises up to about 30 percent by weight of a peroxide curable epichlorohydrin-ethylene oxide elastomer.

23. A process for forming a magnetic blend composition, comprising:
mixing a polymeric binder system and ferrite magnetic particles to form a mixture;
shaping a form from said mixture;
orienting the ferrite particles in a preferred magnetic orientation; and
curing said mixture by electron beam radiation dosage of at least bout 2.5 megarads.

* * * * *